United States Patent
Zhu

(10) Patent No.: US 11,440,567 B2
(45) Date of Patent: Sep. 13, 2022

(54) SYSTEM TO HANDLE COMMUNICATION DELAYS BETWEEN AN AUTONOMOUS DRIVING SYSTEM AND VEHICLE

(71) Applicant: Baidu USA LLC, Sunnyvale, CA (US)

(72) Inventor: Fan Zhu, Sunnyvale, CA (US)

(73) Assignee: BAIDU USA LLC, Sunnyvale, CA (US)

( * ) Notice: Subject to any disclaimer, the term of this patent is extended or adjusted under 35 U.S.C. 154(b) by 90 days.

(21) Appl. No.: 16/811,463

(22) Filed: Mar. 6, 2020

(65) Prior Publication Data
US 2021/0276592 A1 Sep. 9, 2021

(51) Int. Cl.
*B60W 60/00* (2020.01)
*H04W 4/48* (2018.01)

(52) U.S. Cl.
CPC .... *B60W 60/0018* (2020.02); *B60W 60/0011* (2020.02); *B60W 60/0025* (2020.02); *B60W 60/0057* (2020.02); *B60W 60/0059* (2020.02); *H04W 4/48* (2018.02)

(58) Field of Classification Search
CPC ......... B60W 60/0018; B60W 60/0025; B60W 60/0011; B60W 60/0057; B60W 60/0059; H04W 4/48
See application file for complete search history.

(56) References Cited

U.S. PATENT DOCUMENTS

| | | | |
|---|---|---|---|
| 2018/0091930 A1* | 3/2018 | Jefferies | H04L 63/08 |
| 2018/0297598 A1* | 10/2018 | Yaldo | G08G 1/09623 |
| 2019/0098047 A1* | 3/2019 | Giannopoulos | H04L 63/1483 |
| 2020/0158531 A1* | 5/2020 | Takeuchi | G01C 21/3635 |
| 2020/0324789 A1* | 10/2020 | Ando | G05D 1/0223 |
| 2021/0016803 A1* | 1/2021 | Ishikawa | B60W 40/105 |
| 2021/0078601 A1* | 3/2021 | Sugano | G08G 1/143 |

* cited by examiner

*Primary Examiner* — James J Lee
*Assistant Examiner* — Alexander George Matta
(74) *Attorney, Agent, or Firm* — Womble Bond Dickinson (US) LLP

(57) ABSTRACT

Embodiments disclose systems and methods to operate an autonomous vehicle. In one embodiment, a system (an electronic controlled unit (ECU) of an autonomous driving vehicle (ADV)) receives a command, the command sent by an autonomous driving system (ADS) of the ADV. The system determines a communication state between the ECU and the ADS based on a state machine corresponding to a timing of the received command. If the communication state is of a first state, the system operates the ADV based on the received command. If the communication state is of a second state, the system releases a throttle of the ADV. If the communication state is of a third state, the system releases a throttle of the ADV and brakes using a first threshold of acceleration.

18 Claims, 8 Drawing Sheets

| Category | Communication Status | Steering and Throttle | Break | Auto Status |
|---|---|---|---|---|
| 1 | < 3 cycle (72ms) | Execute ADS command | Execute ADS command | Auto |
| 2 | 3 cycle – 6 cycle | Release throttle and hold current steering | No break | Recoverable Auto (Automatic recover autonomous driving after communication recovers) |
| 3 | 6 cycle – 9 cycle | Release throttle and hold current steering | Mild break (~1m/s^2) | Recoverable Auto (Automatic recover autonomous driving after communication recovers) |
| 4 | 9 cycle | Release throttle and hold current steering | Harsh break (~3m/s^2) | Manual (Requires a user input to recover) |

| Category | Communication Status | Steering and Throttle | Break | Auto Status |
|---|---|---|---|---|
| 1 | < 3 cycle (72ms) | Execute ADS command | Execute ADS command | Auto |
| 2 | 3 cycle – 6 cycle | Release throttle and hold current steering | No break | Recoverable Auto (Automatic recover autonomous driving after communication recovers) |
| 3 | 6 cycle – 9 cycle | Release throttle and hold current steering | Mild break (~1m/s^2) | Recoverable Auto (Automatic recover autonomous driving after communication recovers) |
| 4 | 9 cycle | Release throttle and hold current steering | Harsh break (~3m/s^2) | Manual (Requires a user input to recover) |

SYSTEM TO HANDLE COMMUNICATION DELAYS BETWEEN AN AUTONOMOUS DRIVING SYSTEM AND VEHICLE

TECHNICAL FIELD

Embodiments of the present disclosure relate generally to operating autonomous driving vehicles. More particularly, embodiments of the disclosure relate to a system to handle communication delays between an autonomous driving system (ADS) of an autonomous driving vehicle (ADV) and the ADV.

BACKGROUND

Vehicles operating in an autonomous mode (e.g., driverless) can relieve occupants, especially the driver, from some driving-related responsibilities. When operating in an autonomous mode, the vehicle can navigate to various locations using onboard sensors, allowing the vehicle to travel with minimal human interaction or in some cases without any passengers.

Motion planning and control are critical operations in autonomous driving. However, conventional motion planning operations estimate the difficulty of completing a given path mainly from its curvature and speed, without considering the differences in features for different types of vehicles. Same motion planning and control is applied to all types of vehicles, which may not be accurate and smooth under some circumstances.

A communication lost or delay between an autonomous driving system of a vehicle and the vehicle is a serious problem that can happen during autonomous driving. While a possibility of communication lost/delay exists, the consequences of a communication lost/delay should be mitigated.

BRIEF DESCRIPTION OF THE DRAWINGS

Embodiments of the disclosure are illustrated by way of example and not limitation in the figures of the accompanying drawings in which like references indicate similar elements.

FIG. 3 illustrates communication status for an electronic control unit (ECU) according to one embodiment.

DETAILED DESCRIPTION

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosures.

Reference in the specification to "one embodiment" or "an embodiment" means that a particular feature, structure, or characteristic described in conjunction with the embodiment can be included in at least one embodiment of the disclosure. The appearances of the phrase "in one embodiment" in various places in the specification do not necessarily all refer to the same embodiment.

According to some embodiments, systems and methods are disclosed to operate an autonomous vehicle. In one embodiment, a system (an electronic controlled unit (ECU)) of an autonomous driving vehicle (ADV)) receives a command, the command sent by an autonomous driving system (ADS) of the ADV. Here, the ECU includes a real-time system and the ADS includes a non-real-time system. The system determines a communication state between the ECU and the ADS based on a state machine corresponding to a timing of the received command. If the communication state is of a first state, the system operates the ADV based on the received command. If the communication state is of a second state, the system releases a throttle of the ADV. If the communication state is of a third state, the system releases a throttle of the ADV and brakes using a first threshold of acceleration.

Figure 1:
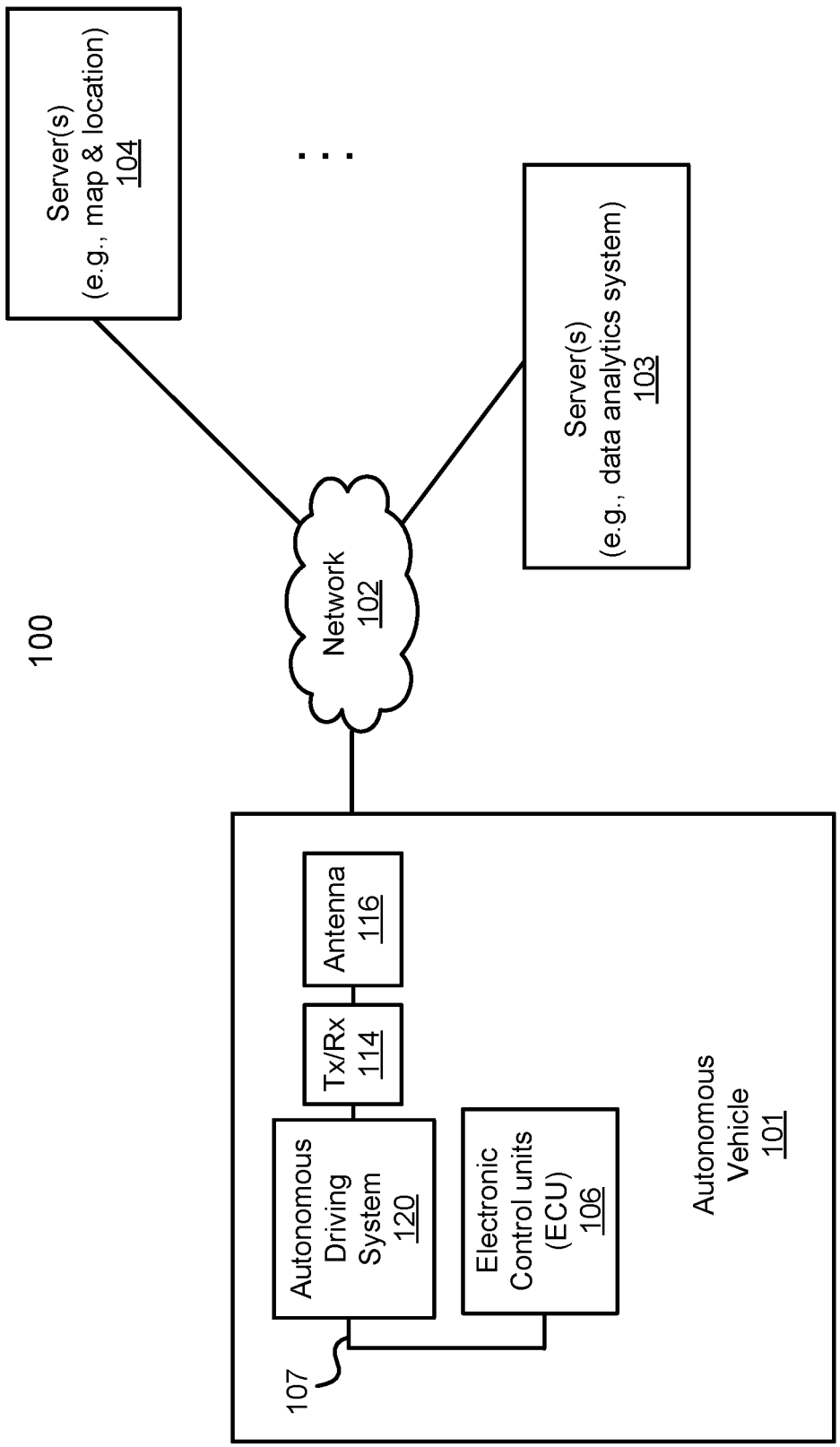
FIG. 1 is a block diagram illustrating a networked system according to one embodiment.

FIG. 1 is a block diagram illustrating an autonomous vehicle network configuration according to one embodiment of the disclosure. Referring to FIG. 1, network configuration 100 includes autonomous vehicle 101 that may be communicatively coupled to one or more servers 103-104 over a network 102. Although there is one autonomous vehicle shown, multiple autonomous vehicles can be coupled to each other and/or coupled to servers 103-104 over network 102. Network 102 may be any type of networks such as a local area network (LAN), a wide area network (WAN) such as the Internet, a cellular network, a satellite network, or a combination thereof, wired or wireless. Server(s) 103-104 may be any kind of servers or a cluster of servers, such as Web or cloud servers, application servers, backend servers, or a combination thereof. Servers 103-104 may be data analytics servers, content servers, traffic information servers, map and point of interest (MPOI) severs, or location servers, etc.

An autonomous driving vehicle refers to a vehicle that can be configured to in an autonomous mode in which the vehicle navigates through an environment with little or no input from a driver. Such an autonomous driving vehicle can include a sensor system having one or more sensors that are configured to detect information about the environment in which the vehicle operates. The vehicle and its associated controller(s) use the detected information to navigate through the environment. Autonomous driving vehicle 101 can operate in a manual mode, a full autonomous mode, or a partial autonomous mode.

For one embodiment, autonomous vehicle 101 includes one or more electronic control units (ECUs) 106 communicatively coupled to autonomous driving system (ADS) 120. ECUs 106 can be an embedded system in automotive electronics that controls one or more of the electrical systems or subsystems in a vehicle or ECUs 106 can be a controller that includes a microprocessor, memory, storage, and/or a communication interface with which it can communicate with various systems of the vehicle such as ADS 120 via network 107. ECUs 106 can include, but is not limited to, a door control unit, an engine control unit, a powertrain control module, a seat control unit, a speed control unit, a telematics control unit, a brake control module (anti-lock braking or electronic control stability), a battery management unit, etc.

ECUs 106 can receive a command to apply a throttle, a brake, or steering a direction, etc. for the ADV. In one embodiment, ECUs 106 can post a status of the ADV indicating whether the ADV is in autonomous mode, a manual mode, or a partial autonomous mode. For one embodiment, ECUs 106 can communicate with ADS 120 via network 107. For one embodiment, the one or more ECUs 106 may be an integrated component.

Communications network 107 may be a controller area network (CAN) bus, an Ethernet network, a wireless communications network, another type of communications network, or a combination of different communication networks. For one embodiment, ADS 120 is communicatively coupled to transceiver 114, which is communicatively coupled to antenna 116, through which autonomous vehicle 101 can wirelessly transmit data to, and receive data from, servers 103-104.

Figure 2:
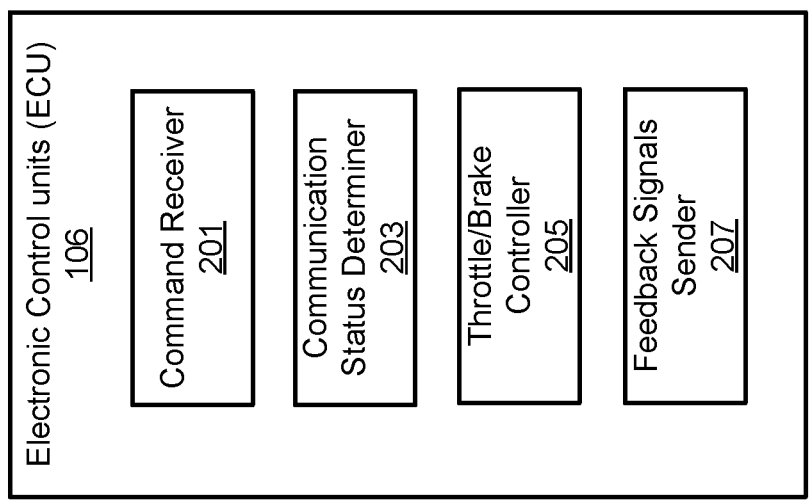
FIG. 2 is a block diagram illustrating an electronic control unit (ECU) according to one embodiment.

FIG. 2 is a block diagram illustrating an electronic control unit (ECU) according to one embodiment. Referring to FIG. 2, ECU 106 includes command receiver 201, communication status determiner 203, throttle/brake controller 205, and feedback signals sender 207. Command receiver 201 can receive a command (throttle command, brake command, steering command, etc.) from an autonomous driving system (ADS), such as ADS 120 of FIG. 1. Communication status determiner 203 can determine a communication status between ADS 120 and ECU 106. ECU 106 can determine a communication status, via regular messages or a periodic heart bit signal, between autonomous driving system (ADS) 120 and ECU 106. The communication status can indicate how long there has been a loss of communication, e.g., a communication delay or communication lost, between the ADS 120 and ECU 106. Throttle/brake controller 205 can control a throttle or a brake of ADV 101. feedback signals sender 207 can send a feedback signal from ECU 106 to ADS 120. The feedback signal can be a signal indicating a communication status for ADV 101.

FIG. 3 illustrates communication status for an electronic control unit (ECU) according to one embodiment. Referring to FIG. 3, communication status has four categories. The first category indicates an ADS communication message (e.g., ADS commands or a periodic pulse) is received by an ECU (such as ECU 106 of FIG. 2) within three communication cycles (e.g., corresponding or similar to driving/planning cycles such as 100 ms cycles). In one embodiment the communication message is communicated via a communication bus, such as a CAN bus, of ADV 101. In one embodiment, a communication cycle has a period of approximately 24 milliseconds, so three cycles equal approximately 72 milliseconds. For the first category, ECU executes steering/throttle, and brake commands received from an ADS. The autonomous status of the vehicle is in an autonomous mode.

The second category indicates an ADS communication message is received by the ECU between three and six communication cycles. In one embodiment, at the third communication cycle, the ECU releases a throttle, maintains a current steering of the ADV, and does not apply a brake. The autonomous status of the vehicle switches from the autonomous mode to a recoverable autonomous mode. In one embodiment, the recoverable autonomous mode is a subset of the autonomous mode. In response to the ECU receiving a communication message in between the third and sixth communication cycles, ECU automatically recovers the autonomous driving mode and the ECU continues to execute the ADS commands.

The third category indicates that an ADS communication message is received by the ECU between six and nine communication cycles. In one embodiment, at the sixth communication cycle, the ECU releases a throttle, maintains a current steering of the ADV and applies a mild brake (e.g., approximately one m/s^2). The autonomous status of the vehicle maintains the recoverable autonomous mode. In response to the ECU receiving a communication message in between the sixth and ninth communication cycles, ECU automatically recovers the autonomous driving mode after communication recovers and the ECU continues to execute the ADS commands.

The fourth category indicates an ADS communication message is received by the ECU more than nine communication cycles later. In one embodiment, at the ninth communication cycle, the ECU releases a throttle, maintains a current steering of the ADV and the ECU applies a harsh brake (e.g., approximately three m/s^2). The autonomous status of the vehicle is switched to manual mode. In response to the ECU receiving the ADS communication message sometimes after the ninth communication cycle, the ECU maintains the manual driving mode and does not recover to the autonomous driving mode. Because the ADV 101 is in a manual driving mode, subsequent ADS commands sent to the ECU would not be processed. Rather, brake, throttle, and steering commands are processed from a steering wheel and physical throttle/brake pads of the ADV 101. After communication recovers, ECU stays in the manual driving mode. ECU can switch to the autonomous driving mode in response to a user input (e.g., via a user interface of the ADS or a different user input).

In one embodiment, the ECU posts a communication status (autonomous mode, manual mode, recoverable autonomous mode) on the communication bus for the ADS to digest the ECU communication status.

Figure 4:
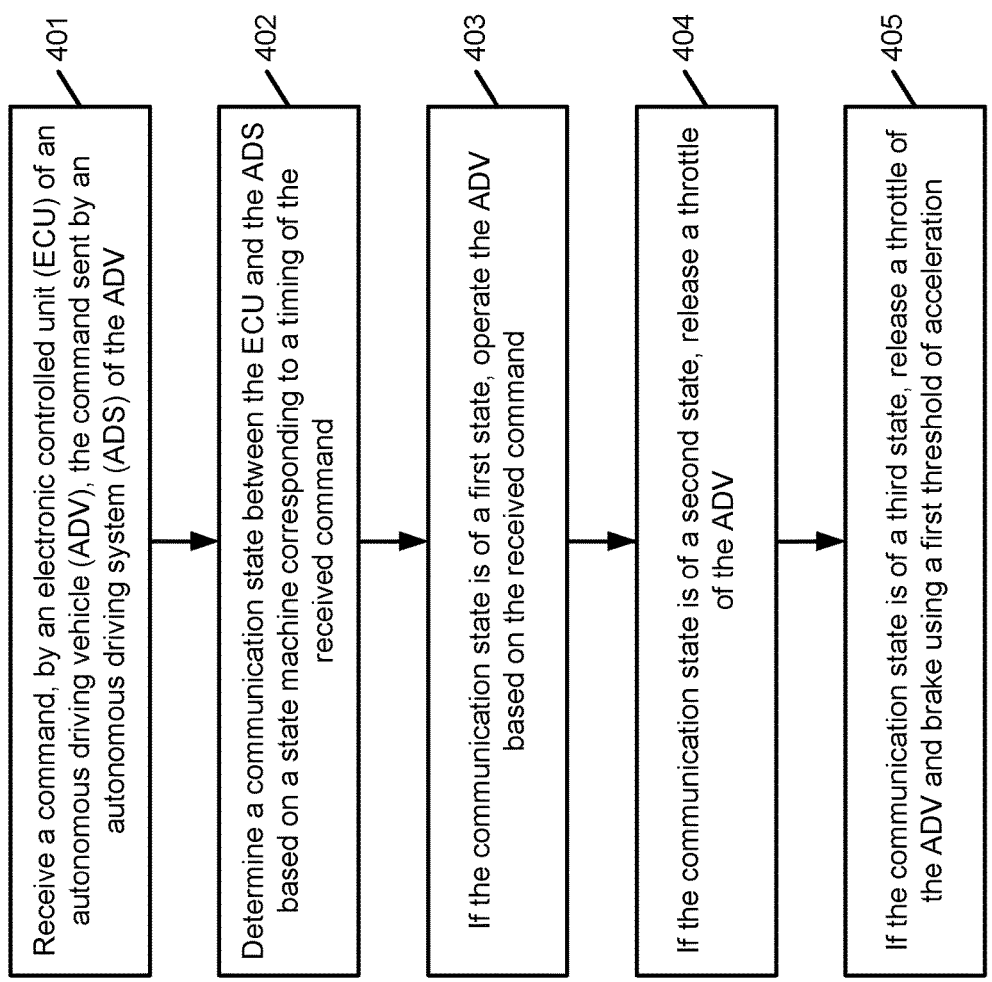
FIG. 4 is a flow diagram illustrating a method for operating an autonomous driving vehicle according to one embodiment.

FIG. 4 is a flow diagram illustrating a method for operating an autonomous driving vehicle according to one embodiment. Process 400 may be performed by processing logic which may include software, hardware, or a combination thereof. For example, process 400 may be performed by ECU 106 of FIG. 1. Referring to FIG. 4, in operation 401, processing logic receives a command, by an electronic controlled unit (ECU) of an autonomous driving vehicle (ADV), the command sent by an autonomous driving system (ADS) of the ADV. In operation 402, processing logic determines a communication state between the ECU and the ADS based on a state machine corresponding to a timing of the received command. In operation 403, if the communication state is of a first state, processing logic operates the ADV based on the received command. In operation 404, if the communication state is of a second state, processing logic releases a throttle of the ADV. In operation 404, if the communication state is of a second state, processing logic releases a throttle of the ADV. In operation 405, if the communication state is of a third state, processing logic releases a throttle of the ADV and brakes using a first threshold of acceleration.

In one embodiment, if the communication state is of a fourth state, processing logic releases a throttle of the ADV and brakes using a second threshold of acceleration. In one embodiment, processing logic generates a feedback signal by the ECU based on the communication state, where the ADS receives the feedback signal from the ECU to determine a status of the ADV.

In one embodiment, the status of the ADV is one of an autonomous mode, a recoverable autonomous mode, or a manual mode, where the ECU operates the ADV from the autonomous mode or the recoverable autonomous mode to the manual mode if the communication state is of the fourth state, and where the ADS sends a command to the ECU to operate the ADV from the manual mode to the autonomous mode. In one embodiment, the ECU includes a real-time system that generates a response with a determinate delay and the ADS includes a non real-time system that generates a command with a determinate or an in-determinate delay.

In one embodiment, the communication status is of: the first state if the ECU receives the command within a first delay threshold; the second state if the ECU receives the command between the first delay threshold and a second delay threshold; the third state if the ECU receives the command between the second delay threshold and a third delay threshold; and the fourth state if the ECU receives the command beyond the third delay threshold. In one embodiment, the first, second, and third delay thresholds are three, six, and nine communication cycles, respectively. In one embodiment, processing logic further determines the communication state between the ECU and the ADS to be the fourth state if a command is not received by the third delay threshold.

Figure 5:
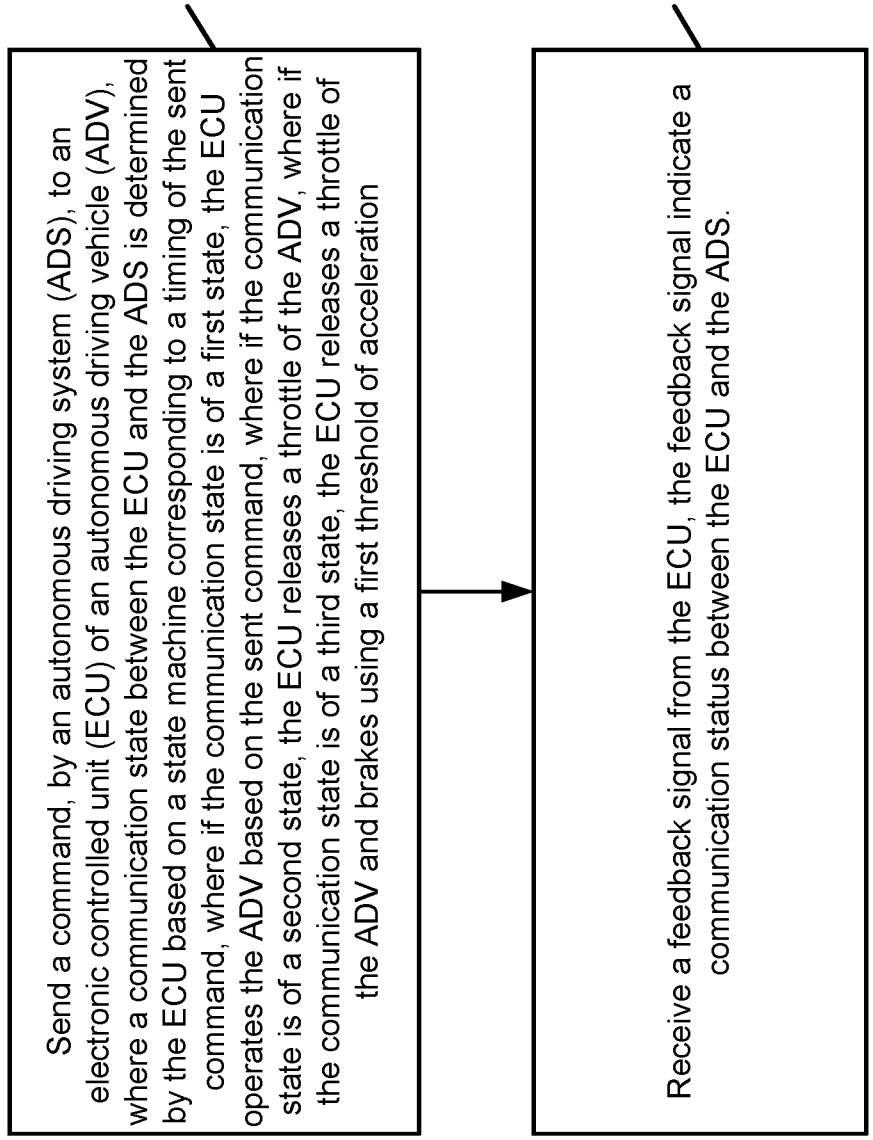
FIG. 5 is a flow diagram illustrating a method for operating an autonomous driving vehicle according to one embodiment.

FIG. 5 is a flow diagram illustrating a method for operating an autonomous driving vehicle according to one embodiment. Process 500 may be performed by processing logic which may include software, hardware, or a combination thereof. For example, process 400 may be performed by ADS 120 of FIG. 1. Referring to FIG. 5, in operation 501, processing logic sends a command to an ECU of an ADV, where a communication state between the ECU and the ADS is determined by the ECU based on a state machine corresponding to a timing of the sent command, where if the communication state is of a first state, the ECU operates the ADV based on the sent command, where if the communication state is of a second state, the ECU releases a throttle of the ADV, where if the communication state is of a third state, the ECU releases a throttle of the ADV and brakes using a first threshold of acceleration. In operation 502, processing logic receives a feedback signal from the ECU, the feedback signal indicates a communication status between the ECU and the ADS.

Figure 6:
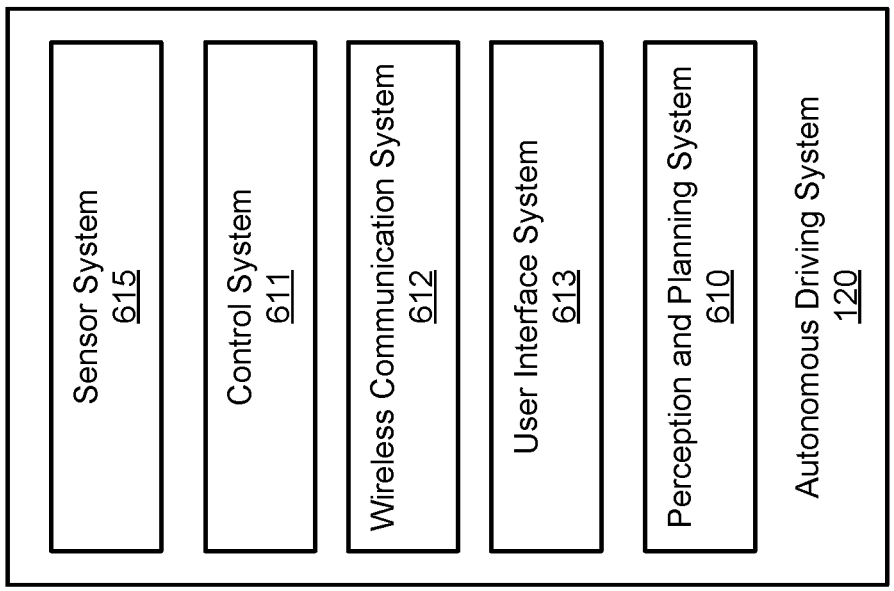
FIG. 6 is a block diagram illustrating an autonomous driving vehicle according to one embodiment.

FIG. 6 is a block diagram illustrating an autonomous driving system according to one embodiment of the disclosure. Referring to FIG. 6, in one embodiment, autonomous driving system 120 includes, but is not limited to, perception and planning system 610, vehicle control system 611, wireless communication system 612, user interface system 613, and sensor system 615.

In another embodiment, ADS 120 includes perception and planning system 610 and ECUs 106 includes vehicle control system 611, wireless communication system 612, user interface system 613, and sensor system 615. ADS 120 and/or ECUs 106 may further include certain common components included in ordinary vehicles, such as, an engine, wheels, steering wheel, transmission, etc., which may be controlled by vehicle control system 611 and/or perception and planning system 610 using a variety of communication signals and/or commands, such as, for example, acceleration signals or commands, deceleration signals or commands, steering signals or commands, braking signals or commands, etc.

Components 610-615 may be communicatively coupled to each other via an interconnect, a bus, a network, or a combination thereof. For example, components 610-615 may be communicatively coupled to each other via a controller area network (CAN) bus. A CAN bus is a vehicle bus standard designed to allow microcontrollers and devices to communicate with each other in applications without a host computer. It is a message-based protocol, designed originally for multiplex electrical wiring within automobiles, but is also used in many other contexts.

Figure 7:
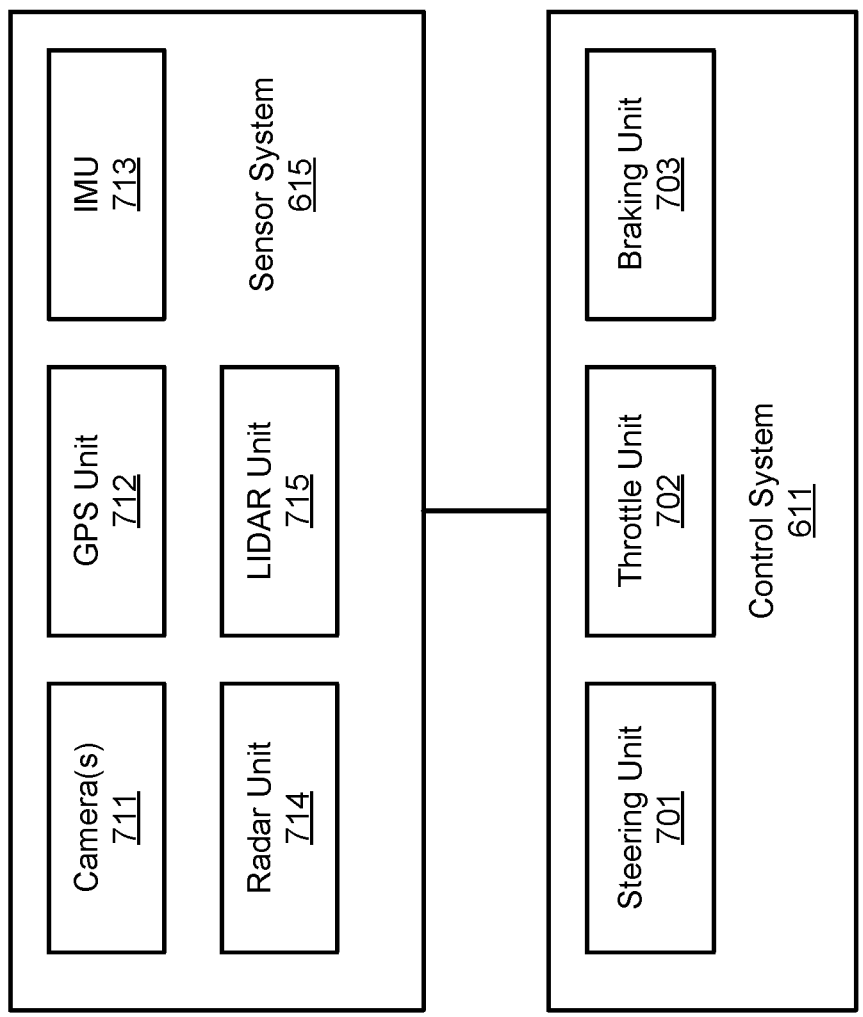
FIG. 7 is a block diagram illustrating an example of an autonomous driving vehicle according to one embodiment.

Referring now to FIG. 7, in one embodiment, sensor system 615 includes, but it is not limited to, one or more cameras 711, global positioning system (GPS) unit 712, inertial measurement unit (IMU) 713, radar unit 714, and a light detection and range (LIDAR) unit 715. GPS system 712 may include a transceiver operable to provide information regarding the position of the autonomous driving vehicle. IMU unit 713 may sense position and orientation changes of the autonomous driving vehicle based on inertial acceleration. Radar unit 714 may represent a system that utilizes radio signals to sense objects within the local environment of the autonomous driving vehicle. In some embodiments, in addition to sensing objects, radar unit 714 may additionally sense the speed and/or heading of the objects. LIDAR unit 715 may sense objects in the environment in which the autonomous driving vehicle is located using lasers. LIDAR unit 715 could include one or more laser sources, a laser scanner, and one or more detectors, among other system components. Cameras 711 may include one or more devices to capture images of the environment surrounding the autonomous driving vehicle. Cameras 711 may be still cameras and/or video cameras. A camera may be mechanically movable, for example, by mounting the camera on a rotating and/or tilting a platform.

Sensor system 615 may further include other sensors, such as, a sonar sensor, an infrared sensor, a steering sensor, a throttle sensor, a braking sensor, and an audio sensor (e.g., microphone). An audio sensor may be configured to capture sound from the environment surrounding the autonomous driving vehicle. A steering sensor may be configured to sense the steering angle of a steering wheel, wheels of the vehicle, or a combination thereof. A throttle sensor and a braking sensor sense the throttle position and braking position of the vehicle, respectively. In some situations, a throttle sensor and a braking sensor may be integrated as an integrated throttle/braking sensor.

In one embodiment, vehicle control system 611 includes, but is not limited to, steering unit 701, throttle unit 702 (also referred to as an acceleration unit), and braking unit 703. Steering unit 701 is to adjust the direction or heading of the vehicle. Throttle unit 702 is to control the speed of the motor or engine that in turn controls the speed and acceleration of the vehicle. Braking unit 703 is to decelerate the vehicle by providing friction to slow the wheels or tires of the vehicle. Note that the components as shown in FIG. 7 may be implemented in hardware, software, or a combination thereof. In one embodiment, vehicle control system 611 and ECU 106 is an integrated system.

Referring back to FIG. 6, wireless communication system 612 is to allow communication between autonomous driving vehicle 601 and external systems, such as devices, sensors, other vehicles, etc. For example, wireless communication system 612 can wirelessly communicate with one or more devices directly or via a communication network. Wireless communication system 612 can use any cellular communication network or a wireless local area network (WLAN), e.g., using WiFi to communicate with another component or system. Wireless communication system 612 could communicate directly with a device (e.g., a mobile device of a passenger, a display device, a speaker within vehicle 601), for example, using an infrared link, Bluetooth, etc. User interface system 613 may be part of peripheral devices implemented within vehicle 601 including, for example, a keyboard, a touch screen display device, a microphone, and a speaker, etc.

Some or all of the functions of autonomous driving vehicle 601 may be controlled or managed by perception and planning system 610, especially when operating in an autonomous driving mode. Perception and planning system 610 includes the necessary hardware (e.g., processor(s), memory, storage) and software (e.g., operating system, planning and routing programs) to receive information from sensor system 615, control system 611, wireless communication system 612, and/or user interface system 613, process the received information, plan a route or path from a starting point to a destination point, and then drive vehicle 601 based on the planning and control information. Alternatively, perception and planning system 610 may be integrated with vehicle control system 611.

For example, a user as a passenger may specify a starting location and a destination of a trip, for example, via a user interface. Perception and planning system 610 obtains the trip related data. For example, perception and planning system 610 may obtain location and route information from an MPOI server. The location server provides location services and the MPOI server provides map services and the POIs of certain locations. Alternatively, such location and MPOI information may be cached locally in a persistent storage device of perception and planning system 610.

While autonomous driving vehicle 601 is moving along the route, perception and planning system 610 may also obtain real-time traffic information from a traffic information system or server (TIS). Note that the servers may be operated by a third party entity. Alternatively, the functionalities of the servers may be integrated with perception and planning system 610. Based on the real-time traffic information, MPOI information, and location information, as well as real-time local environment data detected or sensed by sensor system 615 (e.g., obstacles, objects, nearby vehicles), perception and planning system 610 can plan an optimal route and drive vehicle 601, for example, via control system 611, according to the planned route to reach the specified destination safely and efficiently.

Figure 8:
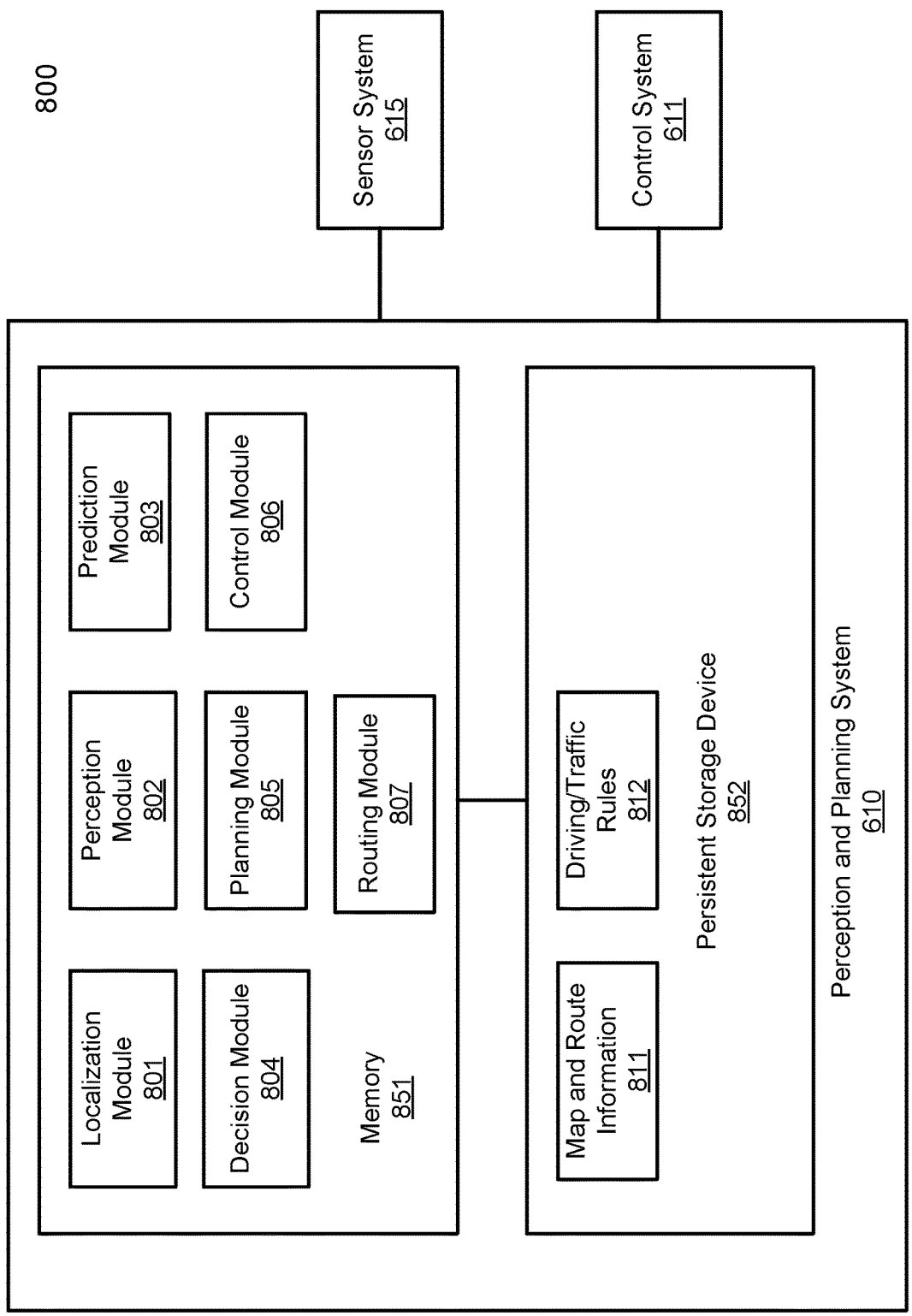
FIG. 8 is a block diagram illustrating an example of a perception and planning system used with an autonomous driving vehicle according to one embodiment.

FIG. 8 is a block diagram illustrating an example of a perception and planning system used with an autonomous driving vehicle according to one embodiment. System 800 may be implemented as a part of autonomous driving vehicle 601 of FIG. 6 including, but is not limited to, perception and planning system 610, control system 611, and sensor system 615. Referring to FIG. 8, perception and planning system 610 includes, but is not limited to, localization module 801, perception module 802, prediction module 803, decision module 804, planning module 805, control module 806, and routing module 807.

Some or all of modules 801-807 may be implemented in software, hardware, or a combination thereof. For example, these modules may be installed in persistent storage device 852, loaded into memory 851, and executed by one or more processors (not shown). Note that some or all of these modules may be communicatively coupled to or integrated with some or all modules of vehicle control system 611 of FIG. 7. Some of modules 801-807 may be integrated together as an integrated module.

Localization module 801 determines a current location of autonomous driving vehicle 300 (e.g., leveraging GPS unit 712) and manages any data related to a trip or route of a user. Localization module 801 (also referred to as a map and route module) manages any data related to a trip or route of a user. A user may log in and specify a starting location and a destination of a trip, for example, via a user interface. Localization module 801 communicates with other components of autonomous driving vehicle 300, such as map and route information 811, to obtain the trip related data. For example, localization module 801 may obtain location and route information from a location server and a map and POI (MPOI) server. A location server provides location services and an MPOI server provides map services and the POIs of certain locations, which may be cached as part of map and route information 811. While autonomous driving vehicle 300 is moving along the route, localization module 801 may also obtain real-time traffic information from a traffic information system or server.

Based on the sensor data provided by sensor system 615 and localization information obtained by localization module 801, a perception of the surrounding environment is determined by perception module 802. The perception information may represent what an ordinary driver would perceive surrounding a vehicle in which the driver is driving. The perception can include the lane configuration, traffic light signals, a relative position of another vehicle, a pedestrian, a building, crosswalk, or other traffic related signs (e.g., stop signs, yield signs), etc., for example, in a form of an object. The lane configuration includes information describing a lane or lanes, such as, for example, a shape of the lane (e.g., straight or curvature), a width of the lane, how many lanes in a road, one-way or two-way lane, merging or splitting lanes, exiting lane, etc.

Perception module 802 may include a computer vision system or functionalities of a computer vision system to process and analyze images captured by one or more cameras in order to identify objects and/or features in the environment of autonomous driving vehicle. The objects can include traffic signals, road way boundaries, other vehicles, pedestrians, and/or obstacles, etc. The computer vision system may use an object recognition algorithm, video tracking, and other computer vision techniques. In some embodiments, the computer vision system can map an environment, track objects, and estimate the speed of objects, etc. Perception module 802 can also detect objects based on other sensors data provided by other sensors such as a radar and/or LIDAR.

For each of the objects, prediction module 803 predicts what the object will behave under the circumstances. The prediction is performed based on the perception data perceiving the driving environment at the point in time in view of a set of map/rout information 811 and traffic rules 812. For example, if the object is a vehicle at an opposing direction and the current driving environment includes an intersection, prediction module 803 will predict whether the vehicle will likely move straight forward or make a turn. If the perception data indicates that the intersection has no traffic light, prediction module 803 may predict that the vehicle may have to fully stop prior to enter the intersection. If the perception data indicates that the vehicle is currently at a left-turn only lane or a right-turn only lane, prediction module 803 may predict that the vehicle will more likely make a left turn or right turn respectively.

For each of the objects, decision module 804 makes a decision regarding how to handle the object. For example, for a particular object (e.g., another vehicle in a crossing route) as well as its metadata describing the object (e.g., a speed, direction, turning angle), decision module 804 decides how to encounter the object (e.g., overtake, yield, stop, pass). Decision module 804 may make such decisions according to a set of rules such as traffic rules or driving rules 812, which may be stored in persistent storage device 852.

Routing module 807 is configured to provide one or more routes or paths from a starting point to a destination point. For a given trip from a start location to a destination location, for example, received from a user, routing module 807 obtains route and map information 811 and determines all possible routes or paths from the starting location to reach the destination location. Routing module 807 may generate a reference line in a form of a topographic map for each of the routes it determines from the starting location to reach the destination location. A reference line refers to an ideal route or path without any interference from others such as other vehicles, obstacles, or traffic condition. That is, if there is no other vehicle, pedestrians, or obstacles on the road, an ADV should exactly or closely follows the reference line. The topographic maps are then provided to decision module 804 and/or planning module 805. Decision module 804 and/or planning module 805 examine all of the possible routes to select and modify one of the most optimal routes in view of other data provided by other modules such as traffic conditions from localization module 801, driving environment perceived by perception module 802, and traffic condition predicted by prediction module 803. The actual path or route for controlling the ADV may be close to or different from the reference line provided by routing module 807 dependent upon the specific driving environment at the point in time.

Based on a decision for each of the objects perceived, planning module 805 plans a path or route for the autonomous driving vehicle, as well as driving parameters (e.g., distance, speed, and/or turning angle), using a reference line provided by routing module 807 as a basis. That is, for a given object, decision module 804 decides what to do with the object, while planning module 805 determines how to do it. For example, for a given object, decision module 804 may decide to pass the object, while planning module 805 may determine whether to pass on the left side or right side of the object. Planning and control data is generated by planning module 805 including information describing how vehicle 300 would move in a next moving cycle (e.g., next route/path segment). For example, the planning and control data may instruct vehicle 300 to move 10 meters at a speed of 30 mile per hour (mph), then change to a right lane at the speed of 25 mph.

Based on the planning and control data, control module 806 controls and drives the autonomous driving vehicle, by sending proper commands or signals to vehicle control system 611, according to a route or path defined by the planning and control data. The planning and control data include sufficient information to drive the vehicle from a first point to a second point of a route or path using appropriate vehicle settings or driving parameters (e.g., throttle, braking, steering commands) at different points in time along the path or route.

In one embodiment, the planning phase is performed in a number of planning cycles, also referred to as driving cycles, such as, for example, in every time interval of 100 milliseconds (ms). For each of the planning cycles or driving cycles, one or more control commands will be issued based on the planning and control data. That is, for every 100 ms, planning module 805 plans a next route segment or path segment, for example, including a target position and the time required for the ADV to reach the target position. Alternatively, planning module 805 may further specify the specific speed, direction, and/or steering angle, etc. In one embodiment, planning module 805 plans a route segment or path segment for the next predetermined period of time such as 5 seconds. For each planning cycle, planning module 805 plans a target position for the current cycle (e.g., next 5 seconds) based on a target position planned in a previous cycle. Control module 806 then generates one or more control commands (e.g., throttle, brake, steering control commands) based on the planning and control data of the current cycle.

Note that decision module 804 and planning module 805 may be integrated as an integrated module. Decision module 804/planning module 805 may include a navigation system or functionalities of a navigation system to determine a driving path for the autonomous driving vehicle. For example, the navigation system may determine a series of speeds and directional headings to affect movement of the autonomous driving vehicle along a path that substantially avoids perceived obstacles while generally advancing the autonomous driving vehicle along a roadway-based path leading to an ultimate destination. The destination may be set according to user inputs via user interface system 613. The navigation system may update the driving path dynamically while the autonomous driving vehicle is in operation. The navigation system can incorporate data from a GPS system and one or more maps so as to determine the driving path for the autonomous driving vehicle.

According to one embodiment, a system architecture of an autonomous driving system as described above includes, but it is not limited to, an application layer, a planning and control (PNC) layer, a perception layer, a device driver layer, a firmware layer, and a hardware layer. The application layer may include user interface or configuration application that interacts with users or passengers of an autonomous driving vehicle, such as, for example, functionalities associated with user interface system 613. The PNC layer may include functionalities of at least planning module 805 and control module 806. The perception layer may include functionalities of at least perception module 802. In one embodiment, there is an additional layer including the functionalities of prediction module 803 and/or decision module 804. Alternatively, such functionalities may be included in the PNC layer and/or the perception layer. The firmware layer may represent at least the functionality of sensor system 615, which may be implemented in a form of a field programmable gate array (FPGA). The hardware layer may represent the hardware of the autonomous driving vehicle such as control system 611. The application layer, PNC layer, and perception layer can communicate with the firmware layer and hardware layer via the device driver layer.

Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the disclosure also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present disclosure are not described with reference to any particular programming language. It will be appreciated that a variety of programming languages may be used to implement the teachings of embodiments of the disclosure as described herein.

In the foregoing specification, embodiments of the disclosure have been described with reference to specific exemplary embodiments thereof. It will be evident that various modifications may be made thereto without departing from the broader spirit and scope of the disclosure as set forth in the following claims. The specification and drawings are, accordingly, to be regarded in an illustrative sense rather than a restrictive sense.

What is claimed is:

1. A computer-implemented method for operating an autonomous driving vehicle, the method comprising:
   receiving a command, by an electronic controlled unit (ECU) of an autonomous driving vehicle (ADV), the command sent by an autonomous driving system (ADS) of the ADV, wherein the ECU includes an embedded system in automotive electronics that controls one or more electrical systems or subsystems of the ADV;
   determining a communication state between the ECU and the ADS based on a state machine corresponding to a timing of the received command;
   if the communication state is of a first state, operating the ADV based on the received command;
   if the communication state is of a second state, releasing a throttle of the ADV;
   if the communication state is of a third state, releasing a throttle of the ADV and issuing braking based on a first threshold of acceleration; and
   if the communication state is of a fourth state, releasing a throttle of the ADV and issuing braking based on a second threshold of acceleration, wherein a communication state is of:
   the first state if the ECU receives the command within a first delay threshold;
   the second state if the ECU receives the command between the first delay threshold and a second delay threshold;
   the third state if the ECU receives the command between the second delay threshold and a third delay threshold; and
   the fourth state if the ECU receives the command beyond the third delay threshold, wherein the first, second, and third delay thresholds are three, six, and nine communication cycles, respectively.

2. The method of claim 1, further comprising generating a feedback signal by the ECU based on the communication state, wherein the ADS receives the feedback signal from the ECU to determine a status of the ADV.

3. The method of claim 1, wherein a status of the ADV is one of an autonomous mode, a recoverable autonomous mode, or a manual mode.

4. The method of claim 1, further comprising determining the communication state between the ECU and the ADS to be the fourth state if a command is not received by the third delay threshold.

5. The method of claim 3, wherein the ECU operates the ADV from the autonomous mode or the recoverable autonomous mode to the manual mode if the communication state is of a fourth state.

6. The method of claim 5, wherein the ADS sends a command to the ECU to operate the ADV from the manual mode to the autonomous mode.

7. A non-transitory machine-readable medium having instructions stored therein, which when executed by a processor, cause the processor to perform operations, the operations comprising:
   receiving a command, by an electronic controlled unit (ECU) of an autonomous driving vehicle (ADV), the command sent by an autonomous driving system (ADS) of the ADV, wherein the ECU includes an embedded system in automotive electronics that controls one or more electrical systems or subsystems of the ADV;
   determining a communication state between the ECU and the ADS based on a state machine corresponding to a timing of the received command;
   if the communication state is of a first state, operating the ADV based on the received command;
   if the communication state is of a second state, releasing a throttle of the ADV;

if the communication state is of a third state, releasing a throttle of the ADV and issuing braking based on a first threshold of acceleration; and if the communication state is of a fourth state, releasing a throttle of the ADV and issuing braking based on a second threshold of acceleration, wherein a communication state is of:

the first state if the ECU receives the command within a first delay threshold;

the second state if the ECU receives the command between the first delay threshold and a second delay threshold;

the third state if the ECU receives the command between the second delay threshold and a third delay threshold; and the fourth state if the ECU receives the command beyond the third delay threshold, wherein the first, second, and third delay thresholds are three, six, and nine communication cycles, respectively.

8. The non-transitory machine-readable medium of claim 7, wherein the operations further comprise generating a feedback signal by the ECU based on the communication state, wherein the ADS receives the feedback signal from the ECU to determine a status of the ADV.

9. The non-transitory machine-readable medium of claim 7, wherein a status of the ADV is one of an autonomous mode, a recoverable autonomous mode, or a manual mode.

10. The non-transitory machine-readable medium of claim 9, wherein the ECU operates the ADV from the autonomous mode or the recoverable autonomous mode to the manual mode if the communication state is of a fourth state.

11. The non-transitory machine-readable medium of claim 10, wherein the ADS sends a command to the ECU to operate the ADV from the manual mode to the autonomous mode.

12. The non-transitory machine-readable medium of claim 7, wherein the operations further comprise determining the communication state between the ECU and the ADS to be the fourth state if a command is not received by the third delay threshold.

13. A data processing system, comprising:
a processor; and
a memory coupled to the processor to store instructions, which when executed by the processor, cause the processor to perform operations, the operations including
receiving a command, by an electronic controlled unit (ECU) of an autonomous driving vehicle (ADV), the command sent by an autonomous driving system (ADS) of the ADV, wherein the ECU includes an embedded system in automotive electronics that controls one or more electrical systems or subsystems of the ADV;

determining a communication state between the ECU and the ADS based on a state machine corresponding to a timing of the received command;

if the communication state is of a first state, operating the ADV based on the received command;

if the communication state is of a second state, releasing a throttle of the ADV;

if the communication state is of a third state, releasing a throttle of the ADV and issuing braking based on a first threshold of acceleration; and if the communication state is of a fourth state, releasing a throttle of the ADV and issuing braking based on a second threshold of acceleration, wherein a communication status is of:

the first state if the ECU receives the command within a first delay threshold;

the second state if the ECU receives the command between the first delay threshold and a second delay threshold;

the third state if the ECU receives the command between the second delay threshold and a third delay threshold; and the fourth state if the ECU receives the command beyond the third delay threshold, wherein the first, second, and third delay thresholds are three, six, and nine communication cycles, respectively.

14. The system of claim 13, wherein the operations further comprise generating a feedback signal by the ECU based on the communication state, wherein the ADS receives the feedback signal from the ECU to determine a status of the ADV.

15. The system of claim 13, wherein a status of the ADV is one of an autonomous mode, a recoverable autonomous mode, or a manual mode.

16. The system of claim 15, wherein the ECU operates the ADV from the autonomous mode or the recoverable autonomous mode to the manual mode if the communication state is of a fourth state.

17. The system of claim 16, wherein the ADS sends a command to the ECU to operate the ADV from the manual mode to the autonomous mode.

18. The system of claim 13, wherein the operations further comprise determining the communication state between the ECU and the ADS to be the fourth state if a command is not received by the third delay threshold.

* * * * *